(12) United States Patent
Mann et al.

(10) Patent No.: US 11,602,813 B2
(45) Date of Patent: Mar. 14, 2023

(54) SUCTION DEVICE

(71) Applicant: C. & E. Fein GmbH, Schwaebisch Gmuend-Bargau (DE)

(72) Inventors: Rainer Mann, Dewangen (DE); Joachim Clabunde, Heubach (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 0 days.

(21) Appl. No.: 17/076,632

(22) Filed: Oct. 21, 2020

(65) Prior Publication Data
US 2021/0114155 A1 Apr. 22, 2021

(30) Foreign Application Priority Data
Oct. 21, 2019 (DE) ..................... 20 2019 105 847.1

(51) Int. Cl.
*B23Q 11/00* (2006.01)
*B25F 5/00* (2006.01)
*B23D 59/00* (2006.01)
*B23D 61/00* (2006.01)
*B25F 3/00* (2006.01)

(52) U.S. Cl.
CPC ...... *B23Q 11/0046* (2013.01); *B23Q 11/0071* (2013.01); *B25F 5/008* (2013.01); *B23D 59/006* (2013.01); *B23D 61/006* (2013.01); *B25F 3/00* (2013.01)

(58) Field of Classification Search
CPC . B25F 5/008; B23Q 11/0046; B23Q 11/0071; A47L 7/009; B23D 61/006; B23D 59/006
See application file for complete search history.

(56) References Cited

U.S. PATENT DOCUMENTS

| 5,088,199 A | * | 2/1992 | Romani | .................. B26B 19/44 |
|---|---|---|---|---|
| | | | | 30/132 |
| 7,854,649 B2 | | 12/2010 | Bohne et al. | |
| 2009/0283283 A1 | * | 11/2009 | Oesterle | .................. B25F 5/026 |
| | | | | 173/162.2 |

(Continued)

FOREIGN PATENT DOCUMENTS

| DE | 19617477 A1 | 11/1997 |
|---|---|---|
| DE | 102004039293 A1 | 2/2006 |
| DE | 102012200443 A1 | 7/2013 |

OTHER PUBLICATIONS

Product sheet for Dust Extraction Device Product No. 32133021010.

*Primary Examiner* — Daniel Jeremy Leeds
(74) *Attorney, Agent, or Firm* — Muncy, Geissler, Olds & Lowe, P.C.

(57) ABSTRACT

A suction device for a handheld power tool that is adapted to be driven in oscillation and that is equipped with a gearbox extension housing for mounting of the suction device. The suction device having a body mounted on the gearbox extension housing of the handheld power tool via a mounting section and an air duct formed in the body, the air duct being delimited at one end by an air inlet and at an other end by an air outlet on which a suction apparatus or a dust exhauster is adapted to be detachably mounted. The mounting section of the body is formed essentially as a hollow cylinder and extends between a first plane and a second plane, which are substantially parallel.

17 Claims, 4 Drawing Sheets

(56) References Cited

U.S. PATENT DOCUMENTS

| | | | |
|---|---|---|---|
| 2012/0073410 A1* | 3/2012 | Hoffman | B25B 23/04 |
| | | | 173/1 |
| 2014/0190715 A1 | 7/2014 | Wong et al. | |
| 2017/0129123 A1 | 5/2017 | Thorson et al. | |
| 2018/0117723 A1* | 5/2018 | Boswell | B23Q 11/0046 |
| 2018/0125313 A1* | 5/2018 | King, Jr. | B23Q 11/0046 |
| 2019/0240807 A1 | 8/2019 | Blatz | |
| 2020/0189058 A1* | 6/2020 | King, Jr. | B23Q 11/0071 |

* cited by examiner

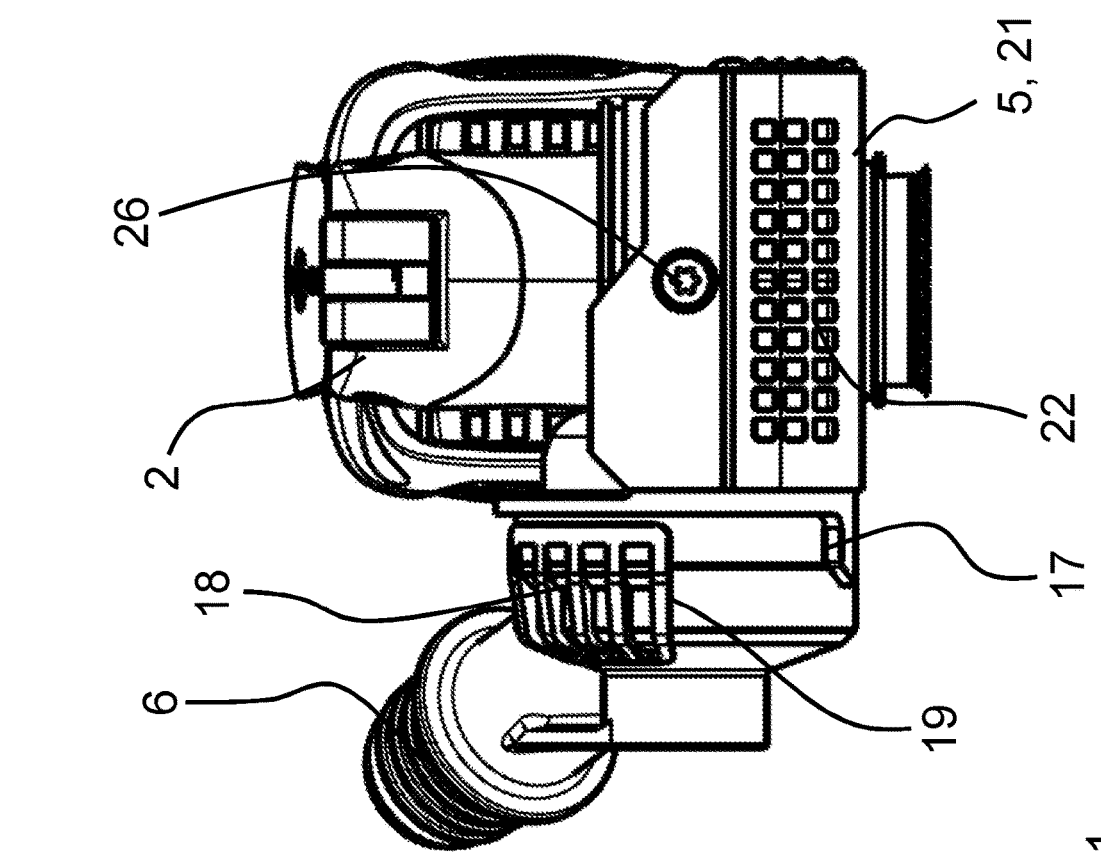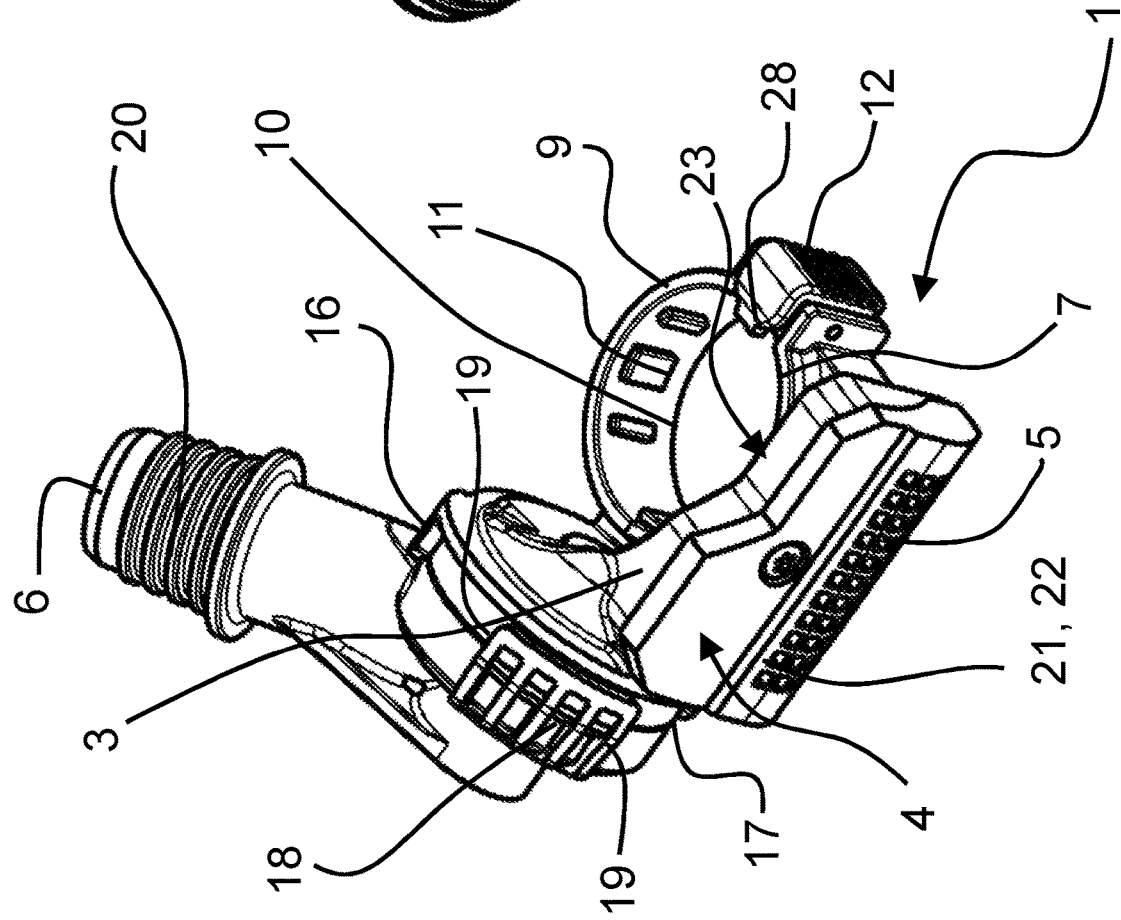

SUCTION DEVICE

This nonprovisional application claims priority under 35 U.S.C. § 119(a) to German Patent Application No. 20 2019 105 847.1, which was filed in Germany on Oct. 21, 2019, and which is herein incorporated by reference.

BACKGROUND OF THE INVENTION

Field of the Invention

The present invention relates to a suction device for a handheld power tool that can be driven in oscillation and that is equipped with a gearbox extension housing for mounting of the suction device, having a body that can be mounted on the gearbox extension housing of the handheld power tool by means of a mounting section, and also having an air duct that is formed in the body and is delimited at one end by an air inlet and at the other end by an air outlet on which a suction apparatus, in particular a dust exhauster, can be detachably mounted.

Description of the Background Art

Handheld power tools that can be driven in oscillation, in which a rotation of the drive shaft produced by an electric drive is converted into an oscillating motion of the toolholder connected to the machine output, frequently are also referred to as oscillating multifunction tools (OMT). It is possible to mount on this toolholder of the handheld power tools an extremely wide variety of insertable tools, with which workpieces, especially workpieces made of wood, can be processed. Particularly when saw blades are being used, the dusts and chips that are produced are extremely disadvantageous for the user, however. On the one hand, the dusts and chips can obstruct the view of the work area, which can have an adverse effect on the work result, but on the other hand the problem also exists that these dusts and chips can be inhaled by the user or can get into the user's eyes, which then in turn has an adverse effect on the user's health. For this reason, suction devices, which extract the dusts and chips produced during processing of the workpiece and thereby keep them away from the user and the work area, are often used as attachments for these types of work.

Such suction devices of the abovementioned type have been known from the prior art for quite a long time, and are supplied by the applicant under item number 32133021010, for example. This suction device known from the prior art has proved its worth many times over, although it has become apparent that it is relatively cumbersome to mount the suction device on the handheld power tool that can be driven in oscillation. To be exact, for this purpose the suction device, which is made of metal, must be secured with screws to the handheld power tool. Moreover, it has proven disadvantageous under certain circumstances that the suction device can only be matched to modified application possibilities.

SUMMARY OF THE INVENTION

It is therefore an object of the present invention to reduce the abovementioned disadvantages.

This object is attained according to an exemplary embodiment of the invention with a suction device of the initially mentioned type by the means that the mounting section of the body is formed essentially as a hollow cylinder and extends between a first plane and a second plane, which preferably are parallel.

In this way, it is possible to simply push the suction device onto the gearbox extension housing of the handheld power tool, thus eliminating the necessity of securing the suction device to the handheld power tool with screws. Because the gearbox extension housing has a circular cross section, the possibility of rotatably supporting the suction device on the gearbox extension housing also exists as a result. Thus, if the insertable tool is intended to be mounted at right angles to the drive shaft of the handheld power tool, for example, then the suction device can simply be rotated, and positioned such that the extraction of dusts and chips can be ensured unchanged.

In order to mount the suction device on the gearbox extension housing of the handheld power tool, it has proven beneficial, furthermore, when at least one encoding region is formed on the inner side of the hollow cylindrical mounting section for installation of the suction device on the handheld power tool. Installation of the suction device is made easier as a result, since a corresponding design of the gearbox extension housing ultimately makes it possible to place the suction device on the gearbox extension housing in only one position. This allows the user to rotate the suction device without the risk that the suction device will detach unintentionally from the gearbox extension housing. This is advantageous, especially in the case when saw blades are used, if they are meant to be mounted on the toolholder of the handheld power tool at different angular positions. Within the scope of the invention, the encoding in this case can be designed, in particular, such that placement of the suction device on the gearbox extension housing is only possible in a position that normally is not used for the insertable tools that generate the dusts and chips to be extracted. Consequently, the risk is reduced that the suction device will detach unintentionally from the handheld power tool.

In this context it has also proven worthwhile when a locking mechanism, which is supported such that it can swivel about a swivel axis in opposition to the force of a return spring, is provided on the mounting section. By this means, the position of the suction device on the gearbox extension housing of the handheld power tool can be defined, which has a positive effect on ease of operation. Especially preferably, the locking mechanism in this case can be implemented as a locking lever, which is pressed against the gearbox extension housing by the force of the return spring, where it defines the rotational position of the suction device on the gearbox extension housing. By this means, it is possible for the user to rotate the suction device, but then to fix its position by letting go of the locking lever. It has then also proven worthwhile in this case when a detent lug, which can engage in a corresponding detent seat that is formed on the gearbox extension housing, is associated with the locking lever.

It has also been shown to be especially beneficial when the angle between the air inlet and the first plane and/or the second plane is between 45° and 90°, and especially preferably is 70°. This achieves the result that, when the suction device is installed, the air inlet points toward the saw blade in use, further supporting the extraction of the dusts and chips produced during the processing of workpieces. Provision is also made within the scope of the invention that the angle between the air inlet and the first plane and/or the second plane is adjustable.

It has also proven advantageous, moreover, when the air outlet is supported on the body such that it can rotate about at least one pivot pin. By this means, it is possible for the user to adjust the position of the air outlet, which has proven advantageous, especially when space is tight. The result is thus achieved in a simple way that the position of an air hose of a suction apparatus can be adapted to the spatial conditions. Within the scope of the invention, it has been shown to be especially advantageous in this regard when precisely one pivot pin is present. Provision is also made, however, that multiple pivot pins are present. In particular, the air outlet can be mounted indirectly or directly on the body by a ball joint, thus giving the user the capability to position an air hose of a suction apparatus in the way required by the task or the spatial conditions.

So that the air inlet does not get into the work area when the suction device is being used, which would be detrimental to the work result and to the work process, it has furthermore proven especially beneficial when the rotation of the air outlet about the pivot pin on the body is limited to an angle of rotation ☐ between a first end position and a second end position.

In this context, it has furthermore proven worthwhile when the angle of rotation ☐ is between 45° and 180°, preferably between 90° and 160°, and especially preferably is 120°. In this way, an adjustability of the air outlet is provided, while it is ensured at the same time that the air outlet and a suction apparatus connected thereto do not get into the work area in a disruptive way.

The limitation of the rotation of the air outlet on the body can be realized especially simply when a first stop and a second stop are formed on the body that interact with corresponding mating stops that are formed on a limiter, which is integrally molded on the rotatable air outlet. It has then proven especially worthwhile in this design when there is an angle of 180° between the two stops and when there is an angle of 60° between the mating stops of the limiter.

It has also proven beneficial when the pivot pin is oriented perpendicular to the swivel axis and perpendicular to a normal vector of the first and/or second plane.

In order to prevent large chips from getting into the air duct, it has furthermore proven advantageous when a grille insert is associated with the air inlet. In the worst case, an ingress of large chips or particles would result in clogging of the air duct or damage to a suction apparatus connected to the air outlet or damage to an air hose leading to the suction apparatus. These chips remain outside on the grille, and can simply be wiped away manually by the user.

Moreover, it has been shown to be especially beneficial when openings, which preferably have an at least approximately rectangular, round, or polygonal shape, are formed in the grille insert. This ensures adequate stability of the grille insert and at the same time achieves the result that those particles that should be extracted can be drawn into the suction device. Provision is also made within the scope of the invention, however, that multiple holes are also grouped in a single slot.

It has also proven advantageous in this context when the number of openings is preferably 6 or more, preferably 12 or more, and especially preferably 24 or more, and further preferably 64 or fewer, preferably 52 or fewer, and especially preferably 36 or fewer, and most especially preferably is 33. In this way, a good compromise is achieved between the suction capacity and the mechanical stability, with this being supported even further by the means that the openings are arranged in multiple rows and that the number of rows preferably is between 2 and 6 and especially preferably is 3.

It has also proven worthwhile within the scope of the invention when a receptacle for a filter is formed by the grille insert in the body. As a result, a filter can be inserted in this receptacle in order to selectively prevent particles from getting into the suction device. In this context, provision is also explicitly made within the scope of the invention that a magnet is arranged in the receptacle in order to prevent magnetic chips, which come from nails contained in the wood being sawn, for example, from being drawn off by the suction apparatus.

It has also proven beneficial in this context when the grille insert is detachably mounted on the body. In this way, different filters can be inserted in the receptacle, for example. Moreover, it is possible as a result to clean the air duct easily or to replace the filter. In addition, different grille inserts can then be used, which differ, e.g., with respect to the number, the arrangement, and/or the shape of the openings used and/or with respect to the angle the air inlet has relative to the first plane and/or the second plane.

The longevity of the suction device is supported, as well, by the means that a guide sleeve, which is connected in a rotationally fixed manner to the air outlet and in which the pivot pin is accommodated, is provided in the air outlet. In this way, the pivot pin itself is decoupled from the air duct, with the result that the extracted dusts and chips cannot get into the pivot pin. The pivot pin can be screwed onto the body and/or the air outlet in this case.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a perspective view of a suction device,

FIG. 2 shows a plan view of the suction device mounted on a handheld power tool.

DETAILED DESCRIPTION

Figure 4:
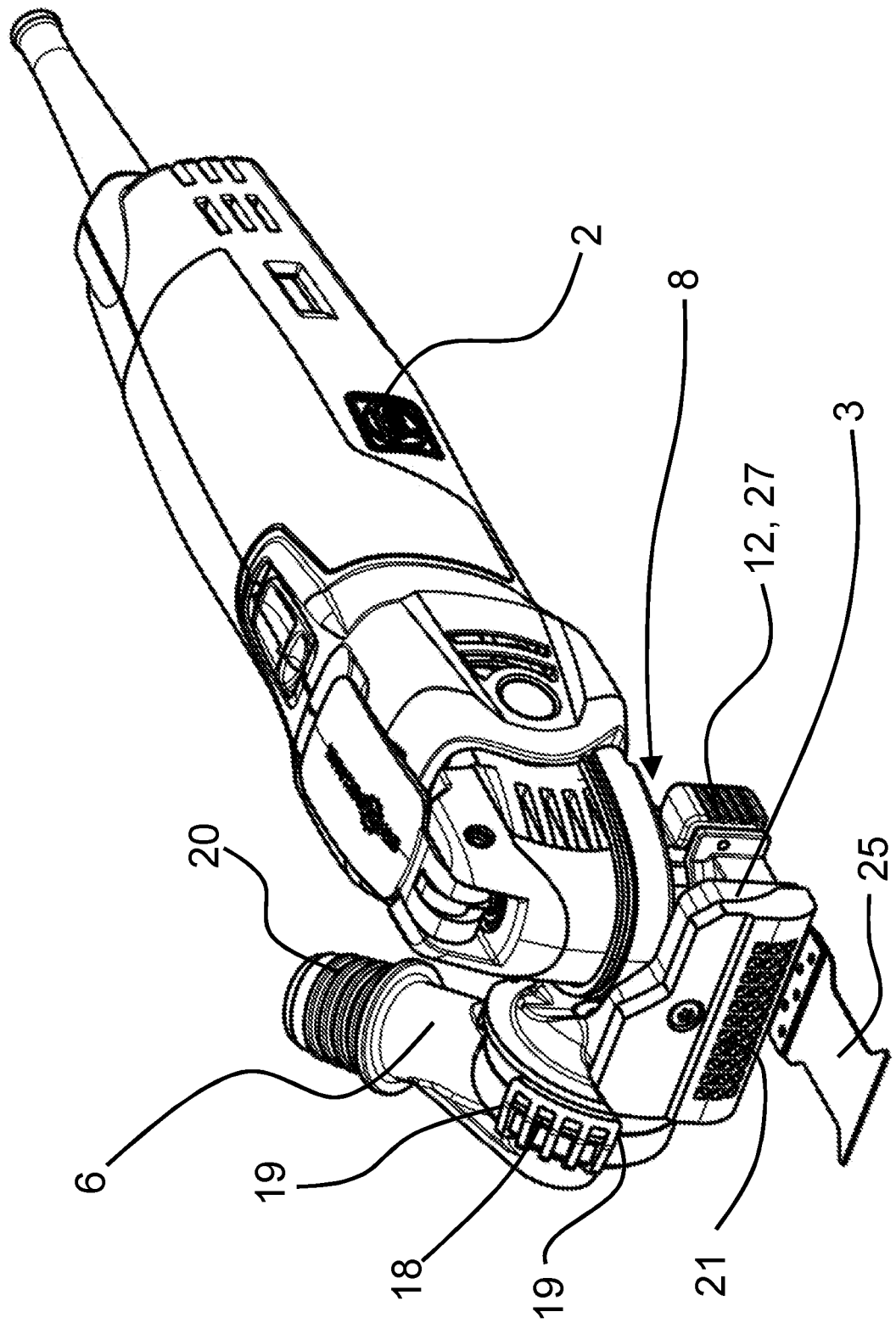
FIG. 4 shows a perspective view of the suction device mounted on the handheld power tool.
Figure 5:
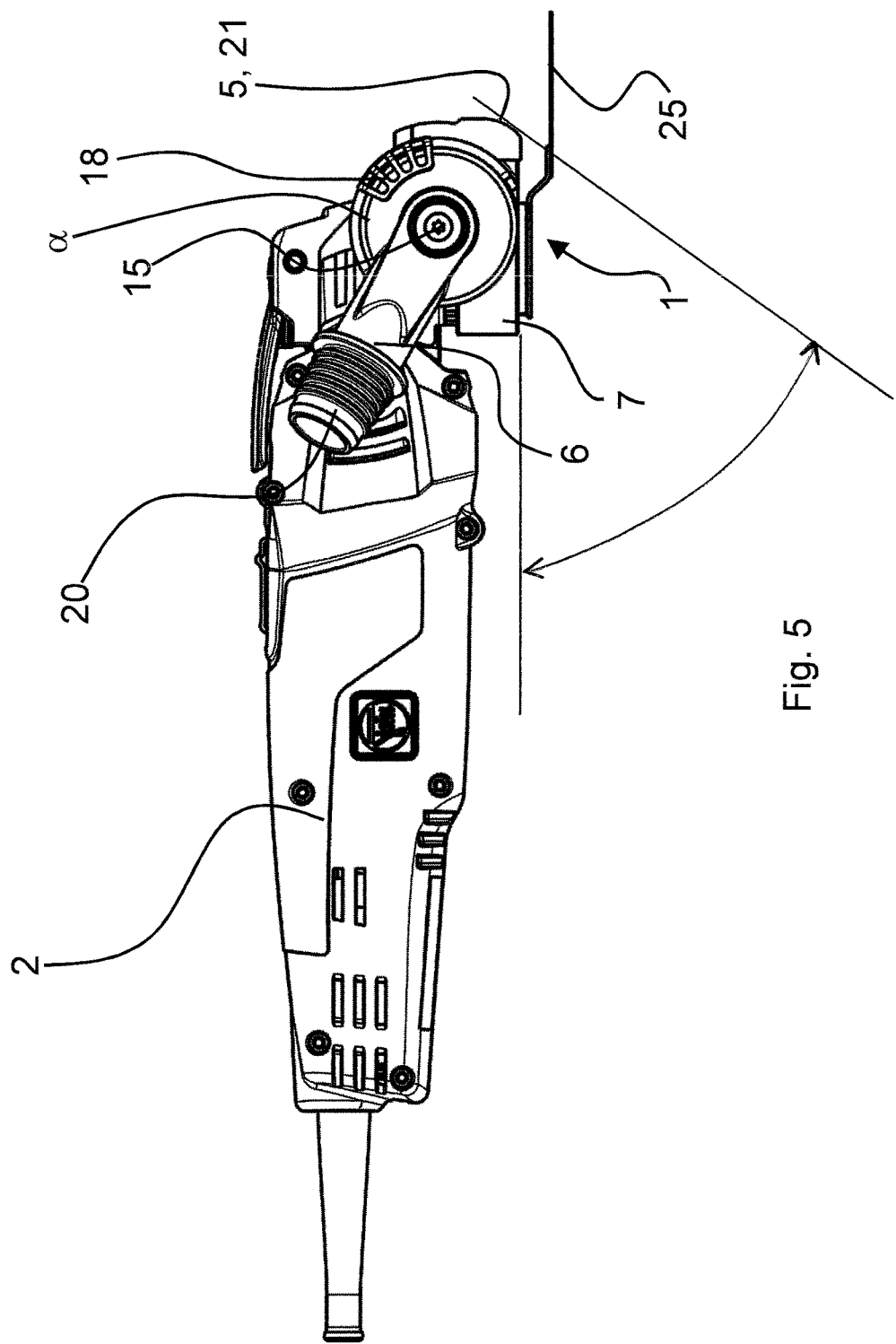
FIG. 5 shows a side view of the suction device mounted on the handheld power tool.

Shown in FIG. 1 in a perspective view is a suction device 1 for a handheld power tool 2 that can be driven in oscillation, which is also evident from FIGS. 4 and 5, in particular. The suction device 1 in this case has a body 3, in which is formed an air duct 4 that is delimited at one end by an air inlet 5 and at the other end by an air outlet 6. A suction apparatus, for example a dust exhauster, can be mounted on the air outlet 6, by which means the dusts and chips produced during processing of a workpiece can be drawn off through the air duct 4. Additionally formed on the body 3 is a mounting section 7, by means of which the suction device 1 can be mounted on a gearbox extension housing 8 of the handheld power tool 2. This mounting section 7 is designed as essentially a hollow cylinder in this case, and extends between a first plane 9 and a second plane 10, which are oriented parallel to one another in the exemplary embodiment shown.

Formed on the inner side of the hollow cylindrical mounting section 7 is an encoding region 11 that is used for installation of the suction device 1 on the handheld power tool 2. This encoding region 11 has the result in this case that the suction device 1 can only be placed on the gearbox extension housing 8 in one position, namely when the projections of the encoding region 11 are aligned with corresponding recesses that are formed on the gearbox extension housing 8 of the handheld power tool 2. Provided on this mounting section 7 is a locking mechanism 12, with which it is possible for the user to lock the suction device 1 on the gearbox extension housing 8, which is to say, in particular, to define its rotational position relative to the gearbox extension housing 8. As will be explained in detail below on the basis of the exploded view of the suction device 1 shown in FIG. 3, the locking mechanism 12 in this design is supported such that it can swivel about a swivel axis 14 in opposition to the force of a return spring 13.

The air outlet 6 is supported on the body 3 such that it can rotate about a pivot pin 15. In this case, the rotation of the air outlet 6 about the pivot pin 15 on the body 3 is limited to an angle of rotation □ between a first end position and a second end position. For this purpose, a first stop 16 and a second stop 17, which are at an angle of 180° with respect to one another, are formed on the body 3. Formed on the rotatable air outlet 6 is a limiter 18, which overlaps the body 3 and has corresponding mating stops 19 that interact with the stops formed on the body 3. The limiter 18 is formed in the shape of a circular arc in this design, and has an angle of 60° between the two mating stops 19. This results in an angle of rotation □ of 120°. The pivot pin 15 in this case is oriented perpendicular to the swivel axis 14 and perpendicular to a normal vector of the first plane 9 and/or the second plane 10. Formed in a grille insert 21, which is arranged on the air inlet 5, are openings 22, which have an approximately rectangular shape in the exemplary embodiment shown. In this case, a total of 33 openings 22 are formed, which are arranged in three rows. The grille insert 21 in this design is detachably mounted on the body 3, thus making it possible to use different grille inserts 21 or to clean the body 3. The angle between the air inlet 5 and the first plane 9 and/or the second plane 10 is between 45° and 90°, which is to say it is 70°. In addition, a receptacle 23, which makes it possible to insert a filter here, is formed in the body 3 by the grille insert 21.

The plan view depicted in FIG. 2 shows, in a front view, the suction device 1 mounted on a handheld power tool 2. Clearly visible here, in particular, are the position of the second stop 17 on the body 3 and the design of the limiter 18. Also evident in FIG. 2 is a screw 26 that serves as a fastener by means of which the grille insert 21 can be detachably screwed to the body 3.

Figure 3:
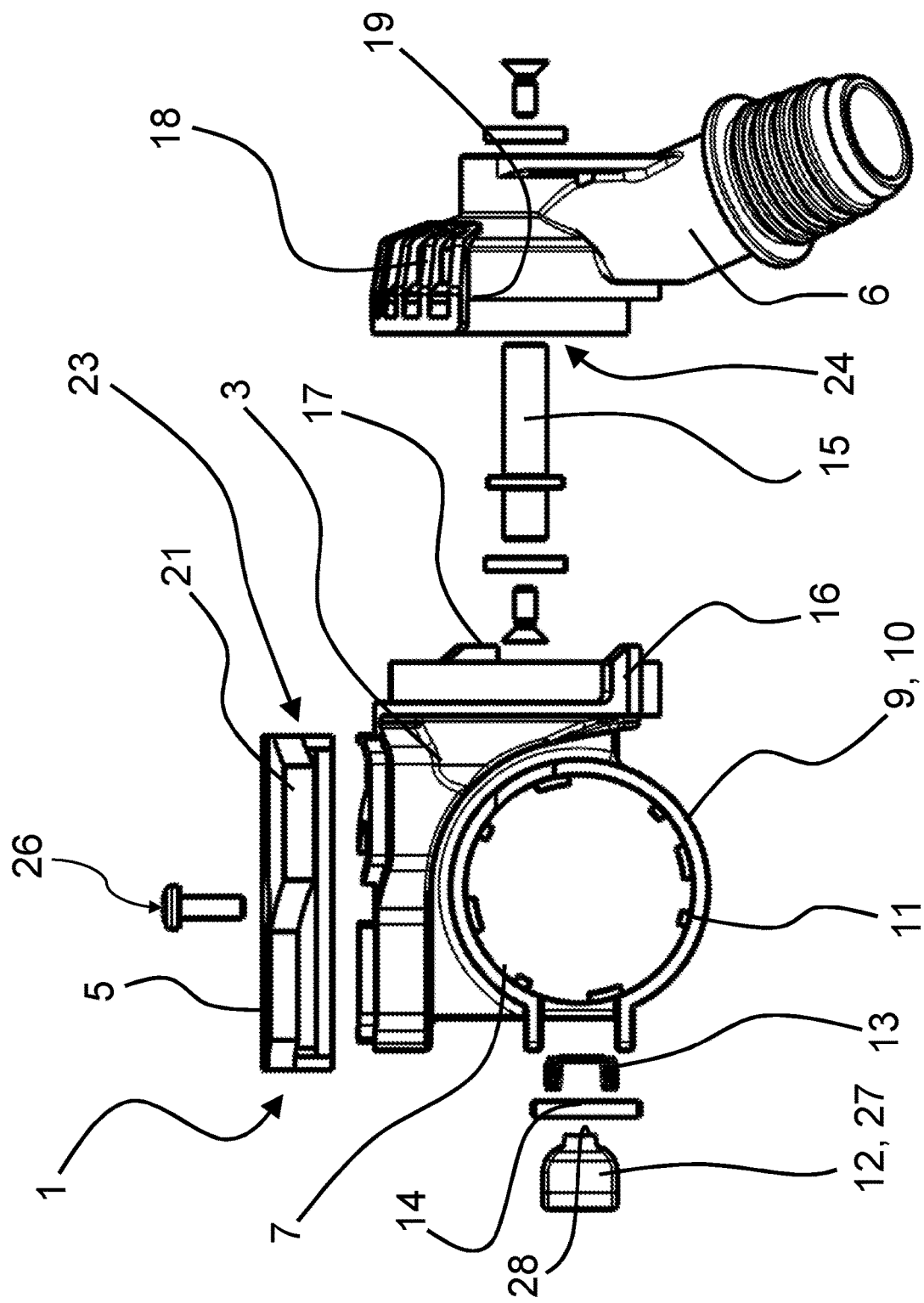
FIG. 3 shows an exploded view of the suction device.

Especially evident from the exploded view of the suction device 1 shown in FIG. 3 is that the pivot pin 15 is arranged to be perpendicular to the swivel axis 14 and that both axes/pins 14, 15 furthermore are oriented perpendicular to a normal vector of the first plane 9 and/or second plane 10. Furthermore, FIG. 3 also shows that the grille insert 21 is screwed to the body 3 by the screw 26, thus making it possible to replace the insert easily. In addition, this also makes the receptacle 23 accessible in order to clean the air duct 4. In the exemplary embodiment shown, the pivot pin 15 is also screwed, namely into both the body 3 and the air outlet 6. Formed in the air outlet 6 itself is a guide sleeve 24, which is connected in a rotationally fixed manner thereto and in which the pivot pin 15 is accommodated in order to protect said pin from dust. The locking mechanism 12, which here is implemented as a locking lever 27, has a detent lug 28, with which the suction device 1 can be locked in position on the gearbox extension housing 8 of the handheld power tool 2.

FIG. 4 shows a plan view of the suction device 1 mounted on the handheld power tool 2. In this depiction—and also in FIG. 5—a saw blade 25, which serves as an insertable tool, is mounted on the toolholder of the handheld power tool 2. Additionally evident from FIGS. 4 and 5 is that the air inlet 5 is inclined by an angle of 70° relative to the first plane 9 and the second plane 10. In this way, when the suction device 1 is used with a handheld power tool 2 on which a saw blade 25 is mounted, the dusts and chips produced during processing of a workpiece can be extracted easily.

In addition to the above-described inclination of the air inlet 5, it is also evident from FIG. 5 that a connecting piece 20, which a suction apparatus can be pushed onto easily, is formed on the air outlet 6.

The manner of operation of the invention is described in detail once again below. Before an insertable tool, in this case the saw blade 25, is placed on the toolholder of the handheld power tool 2, the suction device 1 according to the invention is first connected to the gearbox extension housing 8 of the handheld power tool 2. Because of the encoding, the suction device 1 can only be placed on the gearbox extension housing 8 of the handheld power tool 2 in a single position. Consequently, the projections that are formed in the encoding region 11, which serve as encoding and which are attached to the inner side of the mounting section 7 that is formed as a hollow cylinder, must be aligned with the gearbox extension housing 8 in such a manner that the suction device 1 can be placed on the gearbox extension housing 8. When placing it, the user must pivot the locking lever 27 serving as locking mechanism 12 in opposition to the force of the return spring 13. Now the user can lock the suction device 1 in position on the gearbox extension housing 8 by rotating it until the detent lug 28 of the locking lever 27 reaches engagement with a detent seat formed on the gearbox extension housing 8. The detent lug 28 is pressed into the detent seat by the force of the return spring 13 in this process. When the user now mounts the saw blade 25 in another position, he can then likewise adjust the suction device 1. To do so, he need only disengage the locking lever 27 from the detent seat in opposition to the force of the return spring 13, and rotate the suction device 1. In the next detent seat, the detent lug 28 then re-engages due to the return spring 13, and the suction device 1 is again locked on the gearbox extension housing 8.

In the exemplary embodiment shown, the air outlet 6 is rotatably supported on the pivot pin 15 and thus allows the user to change the position of a hose of a suction apparatus, for example of a dust exhauster, connected to the suction device 1, by which means the hose can always be brought into a position that is not disruptive for the user. In order to be able to connect the suction apparatus easily to the suction device 1, the connecting piece 20, which the user merely needs to push the suction apparatus onto, is formed on the air outlet 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A suction device for a handheld power tool that is adapted to be driven in oscillation and that is equipped with a gearbox extension housing for mounting of the suction device, the suction device comprising:
- a body mounted on the gearbox extension housing of the handheld power tool via a mounting section; and
- an air duct formed in the body, the air duct being delimited at one end by an air inlet and at an other end by an air outlet on which a suction apparatus or a dust exhauster is adapted to be detachably mounted,
- wherein the mounting section of the body is formed essentially as a hollow cylinder and extends between a first plane and a second plane, which are substantially parallel, and
- wherein the air outlet is rotatably supported on the body by at least one pivot pin, the air outlet being rotatable with respect to the body about a longitudinal axis of the at least one pivot pin, such that the longitudinal axis of the at least one pivot pin is an axis of rotation of the air outlet.

2. The suction device according to claim 1, wherein at least one encoding region is formed on an inner surface of the hollow cylinder that forms the mounting section, the at least one encoding region provided for installation of the suction device on the handheld power tool.

3. The suction device according to claim 1, wherein a locking mechanism that is supported such that the locking mechanism can swivel about a swivel axis in opposition to the force of a return spring is provided on the mounting section.

4. The suction device according to claim 1, wherein an angle between a front face of the air inlet and the first plane and/or the second plane is between 45° and 90°, or is 70°.

5. The suction device according to claim 1, wherein the rotation of the air outlet about the at least one pivot pin on the body is limited to an angle of rotation between a first end position and a second end position.

6. The suction device according to claim 5, wherein the angle of rotation is between 45° and 180°, between 90° and 160°, or is 120°.

7. The suction device according to claim 5, wherein, in order to limit the rotation, a first stop and a second stop are formed on the body that interact with corresponding mating stops that are formed on a limiter on the air outlet.

8. The suction device according to claim 1, wherein a locking mechanism that is supported such that the locking mechanism can swivel about a swivel axis in opposition to the force of a return spring is provided on the mounting section and wherein the at least one pivot pin is oriented substantially perpendicular to the swivel axis and substantially perpendicular to a normal vector of the first plane and/or the second plane.

9. The suction device according to claim 1, wherein a grille insert is associated with the air inlet.

10. The suction device according to claim 9, wherein openings, which have an at least approximately rectangular, round, or polygonal shape, are formed in the grille insert.

11. The suction device according to claim 10, wherein a number of the openings is 6 or more, 12 or more, 24 or more, 64 or fewer, 52 or fewer, 36 or fewer, or is 33.

12. The suction device according to claim 10, wherein the openings are arranged in multiple rows, and wherein a number of the rows is between 2 and 6 or is 3.

13. The suction device according to claim 9, wherein a receptacle for a filter is formed in the body and is covered by the grille insert.

14. The suction device according to claim 9, wherein the grille insert is detachably mounted on the body.

15. The suction device according to claim 1, wherein a guide sleeve, which is connected in a rotationally fixed manner to the air outlet and in which the at least one pivot pin is accommodated, is provided in the air outlet.

16. The suction device according to claim 2, wherein the at least one encoding region includes a projection that projects inward from the inner surface of the hollow cylinder forming the mounting section.

17. The suction device according to claim 7, wherein the limiter is integral with the air outlet, such that the limiter rotates with respect to the body simultaneously with rotation of the air outlet.

* * * * *